United States Patent [19]

Sato et al.

[11] Patent Number: 5,244,488
[45] Date of Patent: Sep. 14, 1993

[54] DIRECT SMELTING PROCESS WITH A THERMAL PLASMA

[75] Inventors: Ryoda Sato; Kichinosuke Shoji; Naoshi Takemura, all of Hyogo, Japan

[73] Assignee: Manyo Kogyo Kabushiki Kaisha, Hyogo, Japan

[21] Appl. No.: 582,191

[22] PCT Filed: Jan. 23, 1990

[86] PCT No.: PCT/JP90/00076
§ 371 Date: Sep. 26, 1990
§ 102(e) Date: Sep. 26, 1990

[87] PCT Pub. No.: WO90/08843
PCT Pub. Date: Sep. 8, 1990

[30] Foreign Application Priority Data

Jan. 26, 1989 [JP] Japan ..................... 1-16664
Jul. 12, 1989 [JP] Japan ..................... 1-179373

[51] Int. Cl.⁵ ............................................. C22B 9/22
[52] U.S. Cl. ................................ 75/10.19; 75/10.21; 75/10.22
[58] Field of Search .................. 75/10.19, 10.21, 10.22

[56] References Cited

U.S. PATENT DOCUMENTS 3,856,915 12/1974 Pagnozzi et al. .
3,856,918 12/1974 Skrivan et al. .
4,073,640 2/1978 Soykan ........................ 75/10.19
4,518,417 5/1985 Lugscheider et al. .
4,877,448 10/1989 Lindsay ........................ 75/10.21
4,883,258 11/1989 Foster et al. ................. 75/10.19

FOREIGN PATENT DOCUMENTS 87405 8/1983 European Pat. Off. .
52-53713 4/1977 Japan .
53-44128 11/1978 Japan .
123809 7/1983 Japan .
60-53088 11/1985 Japan .

*Primary Examiner*—Melvyn J. Andrews
*Attorney, Agent, or Firm*—Sixbey, Friedman, Leedom & Ferguson

[57] ABSTRACT

The present invention relates to a process for directly smelting ores, metal oxides or the like with a thermal plasma.

The direct smelting process of the invention can be practiced easily by simple equipment regardless of the form of the material to be smelted without using any plasma forming gas.

The present process is characterized in that a polyphase current voltage is applied to a multiplicity of graphite electrodes to cause arc discharge in air and produce a strongly reducing nontransferred plasma arc due to the resulting oxidation decomposition of the graphite electrodes. The plasma arc is jetted out from the tips of the electrodes directly against the material to be smelted.

6 Claims, 1 Drawing Sheet

DIRECT SMELTING PROCESS WITH A THERMAL PLASMA

TECHNICAL FIELD

The present invention relates to a process for directly smelting ores and metal compounds with a thermal plasma.

BACKGROUND ART

Recently, attention has been directed to the direct smelting process wherein an ore or metal oxide is reduced in a molten state or thermally decomposed with use of a thermal plasma produced by arc discharge to directly obtain a metal or a product enriched in metal.

The direct smelting process attracts attention because of its advantages. When the thermal plasma is used for smelting, a superhigh temperature is obtained which can be maintained with good stability, giving rise to a reaction which requires such a high temperature as is not available with usual heat sources. Since the reaction velocity increases exponentially with temperature, the reaction can be carried out within a shorter period of time with use of an apparatus of smaller size.

As disclosed in U.S. Pat. No. 3,856,918 and Examined Japanese Patent Publication SHO 60-53088, the direct smelting process is practiced by causing arc discharge across a cathode and an anode, and feeding a powder of ore or the like along with a plasma forming gas to melt and decompose the powder while it is passing through a plasma arc, or feeding the powder around a plasma arc to melt and decompose the powder by the radiant heat of the arc. To produce a reducing gas in this process, hydrogen, methane, carbon monoxide or like reducing gas is used as the plasma forming gas along with an inert gas. As disclosed in Examined Japanese Patent Publication SHO 53-44128, it is also known to coat the particles of the powder with a layer of carbonaceous substance in order to effect accelerated reduction.

With the above techniques, however, it is impossible to retain the particulate ore or the like in or around the plasma arc for a sufficient period of time, making it difficult to reduce the material in a molten state or decompose the material and therefore necessitating a cumbersome pretreatment such as the adjustment of the size of particles or coating of the particulate material with a carbonaceous substance.

Further to produce a stabilized plasma arc for a reducing reaction, the process requires a large quantity of hydrogen, argon, methane or like gas as the plasma forming gas.

Additionally, the plasma generator requires means for cooling the electrodes and means for feeding the plasma forming gas and the particulate material. These means render the apparatus complex and result in an increased smelting cost along with the use of large quantity of the plasma forming gas.

An object of the present invention, which has been accomplished in view of these problems, is to provide a direct smelting process which can be practiced easily by simple equipment regardless of the form of material to be smelted and without using any plasma forming gas.

DISCLOSURE OF THE INVENTION

The present invention provides a direct smelting process wherein an ore or metal oxide is melted and reduced or thermally decomposed by a thermal plasma having a reducing atmosphere to obtain a metal or product enriched in metal, the direct smelting process being characterized in that a polyphase current voltage is applied to a multiplicity of graphite electrodes to cause arc discharge in air and produce a strongly reducing nontransferred plasma arc due to the resulting oxidation decomposition of the graphite electrodes, the plasma arc being jetted out from the tips of the electrodes directly against the ore or metal oxide for smelting. In this case, the multiplicity of graphite electrodes are in an inverted conical arrangement so that their tips are approximately equidistantly spaced apart on a substantially circular line, whereby the nontrasferred plasma arc can be forced out concentrically from the tips of the electrodes with ease.

In practicing the present invention, a polyphase current voltage is applied to the multiplicity of electrodes to effect arc discharge, whereby plasma arcs produced between the electrodes are jetted out from the tips of the electrodes by the action of a magnetic field created by the arc current. Furthermore, the plasma arcs jetted out are stirred by a rotating magnetic field set up by the polyphase current. The ore or like material placed on the hearth or in a crucible and to be smelted can be irradiated directly with the plasma arcs of the nontransferred type thus produced.

Since arc discharge is effected in air using the electrodes which are in the form of graphite bars, the carbon monoxide produced by the oxidation of the electrodes releases $(CO)^+$ and $C^+$ ions through the following reactions to create a highly reducing plasma arc and reduce an oxide ore or metal oxide.

$$CO + e \rightarrow (CO)^+ + e \rightarrow C^+ + CO$$

$$CO + e \rightarrow C^+ + O^- e \rightarrow C^+ + O + 2e$$

The plasma arc, having a high temperature, further directly thermally oxidizes sulfide ore and like metal compounds.

For the generation of the plasma arc, there is no need to feed a plasma forming gas, nor is it necessary to protect the electrodes by cooling. If the material to be smelted is rotated when irradiated with the plasma arc, the material can be smelted efficiently.

The direct smelting process of the present invention employs a polyphase current plasma arc generator comprising graphite electrodes, so that it is possible to readily generate nontransferred plasma arcs having a strong reducing effect, directionality and a stirring action. Accordingly, the contemplated material can be smelted directly by being irradiated with the nontransferred plasma arcs regardless of whether it is in the form of particles, grains or blocks and whether it is electrically conductive, even if it is a somewhat wet concentrate obtained by flotation. Thus, ores or metal compounds having widely varying properties can be treated by the present process without any necessity of strictly adjusting the particle size or feed speed. For smelting, a flux or the like can be charged into the furnace or crucible along with the material to be smelted.

The plasma arc forms a strongly reducing atmosphere by the carbon and carbon monoxide ions resulting from the oxidation decomposition of the graphite electrodes. This eliminates the need to supply a reducing plasma forming gas and to use means for cooling the electrodes, permitting a very simple plasma generator to practice the present invention on an enlarged scale, with improved productivity and at a reduced cost.

BEST MODE OF CARRYING OUT THE INVENTION

Figure 1:
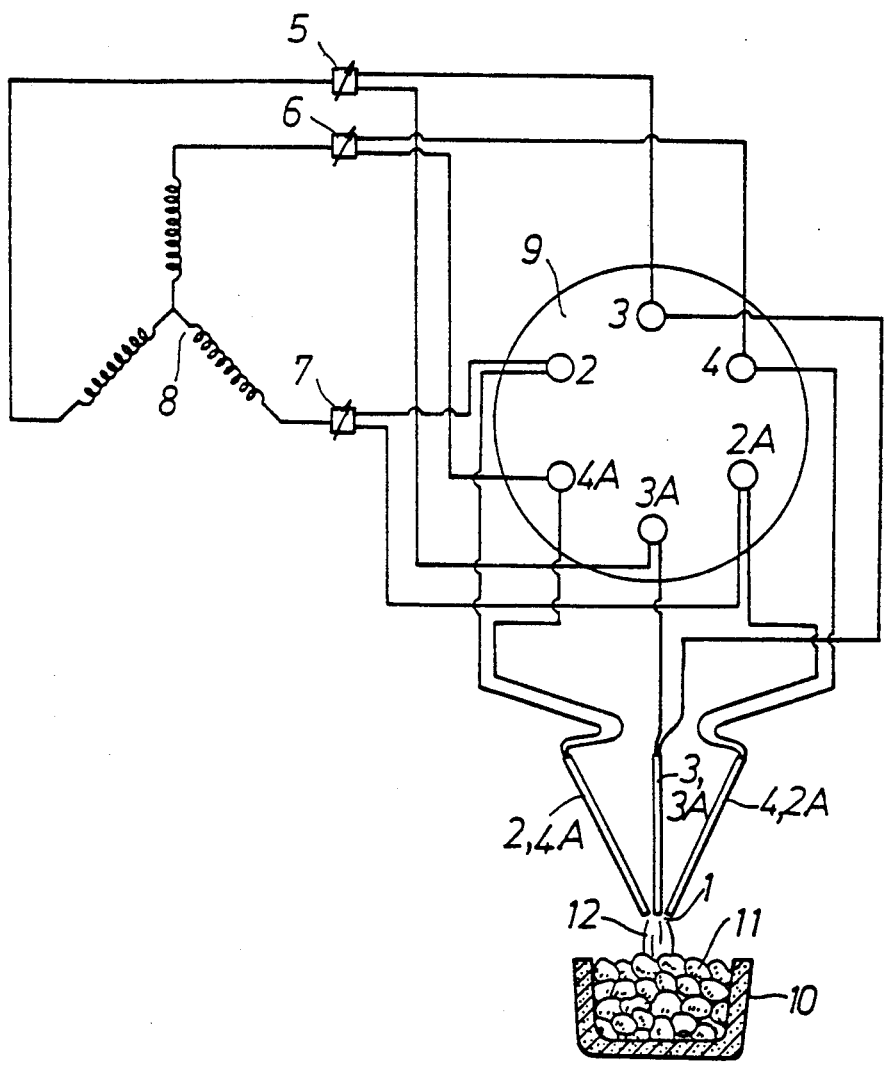
FIG. 1 is a diagram schematically showing a polyphase current plasma arc generator for use in practicing the present invention.

The polyphase current plasma arc generator for use in practicing the present invention will be described first with reference to FIG. 1.

The generator comprises six graphite electrodes 2, 3, 4, 2A, 3A, 4A and a three-phase a.c. power supply 8. In FIG. 1, three electrodes 2, 3, 4 appear since the electrodes 4A, 3A, 2A are positioned behind these electrodes. The six electrodes are in an inverted conical arrangement with their tips approximately equidistantly spaced apart and positioned on a substantially circular line on a plane i.e., they are in a circular array in which the electrodes are inclined downwardly and inwardly toward a common point. The electrodes are movable upward or downward by drive means (not shown), whereby the electrode tips 1 are positionable at an adjusted level. The pairs of electrodes 2, 3, 4 and electrodes 2A, 3A, 4A are connected to the power supply 8 via an electrode connector 9 and current controllers 7, 5, 6, respectively, each comprising a silicon-controlled current device (thyristor), reactor or the like. Each terminal of the electrode connector 9 is indicated at the reference numeral or symbol of the corresponding electrode. When the respective pairs of electrodes 2, 3, 4 and 2A, 3A, 4A are energized with a.c. voltages that differ in phase by 120° from pair to pair, ringlike arcs are generated between the electrodes and are jetted out downward from the electrode tips 1 by the action of electromotive forces. An ore or like material 11 including a flux and placed in a graphite crucible 10 is irradiated with the nontransferred plasma arcs 12 and thereby reduced or decomposed in a molten state for smelting.

The electrodes, as well as the phases of a.c., are not limited to three as illustrated in FIG. 1 but may be at least three. When the graphite electrodes are arranged in as seen in a circular array in which all of the electrodes are inclined downwardly and inwardly toward a common point FIG. 1, the nontransferred plasma arcs 12 can be readily forced out from the electrode tips 1 concentrically. The three-phase current is usually supplied by power companies and is therefore readily available.

The ores and the like to be smelted by the present invention are not limited to those in the specific examples given below but of course include oxide ores and oxides of titanium, vanadium, zirconium and the like, and sulfide ores containing iron, nickel, copper or the like. The ores to be treated are not limited to crude ores but also include concentrates, calcines, roasted products and the like. Metal oxides include compounds which are obtained by wet smelting or chemical treatments.

An improved smelting efficiency can be achieved when the material in the crucible 10 is irradiated with the nontransferred plasma arcs 12 while rotating the crucible 10 as placed on a rotary support. For smelting, suitable quantities of graphite powder, etc. may be added as a flux and auxiliary reducing agents to the ore or like material in the crucible (furnace). Graphite is used as an auxiliary reducing agent usually in an amount of about 10 to 40 wt. % based on the ore. In the case where the reduced metal is Ti or like active metal, the metal can be prevented from oxidation or nitriding during cooling after the reduction by applying Ar gas or the like to the metal after the discontinuation of irradiation with the arcs.

Specific examples are given below wherein ores or compounds were directly smelted using the plasma arc generator.

EXAMPLE 1

Smelting of Magnetite (1) The magnetite treated in this example was in the form of smalls having the composition (wt. %) of Table 1 as determined by chemical analysis.

TABLE 1

| T. Fe | SiO$_2$ | CaO | MgO |
| --- | --- | --- | --- |
| 57.4 | 4.7 | 29.0 | 0.5 |

(2) Siliceous sand (50 g) was admixed as a flux with 150 g of the magnetite, and the mixture was placed into the graphite crucible 10. Using the plasma arc generator of FIG. 1, the ore 11 in the crucible 10 was irradiated and heated with plasma arcs in air for 160 seconds and reduced in a molten state to obtain 89 g of a metal block (pig iron). The power level used was 70 kW.

(3) The metal block (pig iron) obtained had the composition (wt. %) listed in Table 2.

TABLE 2

| C | Si | Mn | P | S |
| --- | --- | --- | --- | --- |
| 4.92 | 4.24 | 0.48 | 0.05 | 0.002 |

The composition indicates that the process effected sufficient reduction to give high carbon and silicon contents and achieved a remarkable desulfurization effect to result in a low sulfur content.

EXAMPLE 2

Smelting of Chromite (1) The chromite used in the example was in the form of smalls having the composition (wt. %) given in Table 3.

TABLE 3

| Cr$_2$O$_3$ | FeO | SiO$_2$ | CaO | MgO | Al$_2$O$_3$ |
| --- | --- | --- | --- | --- | --- |
| 50.2 | 16.6 | 1.2 | 2.0 | 14.3 | 8.3 |

(2) Siliceous sand (20 g) was admixed as a flux with 50 g of the chromite, and the mixture was placed into the graphite crucible and irradiated with plasma arcs for 150 seconds under the same conditions as in Example 1 to obtain 79 g of a reduced metal block (ferrochrome).

(3) When analyzed, the metal block was found to contain 69.2% of Cr and 3.60% of C. The recovery of chromium achieved by reduction was 84%, which was relatively low. This appears attributable to a great evaporation loss since the boiling point of chromium is as low as 2,640° C.

However, the high chromium content of the product indicates that the present process has high ability to reduce oxide ores. Accordingly, it is thought advantageous to practice the process for smelting low-grade chromite having a chromium to iron ratio of up to 2:1, or for preparing a material for stainless steel by smelting the ore along with an iron ore added thereto.

EXAMPLE 3

Preparation of Cu-Al Alloy by Reduction of Alumina (1) Alumina (80 g) was admixed with 40 g of finely divided copper, and the mixture was placed into the graphite crucible and irradiated with plasma arcs for 180 seconds under the same conditions as in Example 1 to obtain 70 g of a metal block (copper-aluminum alloy).

(2) The alloy was 45.2% in aluminum content. Since aluminum is more difficult to reduce and lower in boiling point than chromium recovered in Example 2, aluminum was recovered in the form of an alloy of copper which is readily reducible so as to assure accelerated reduction by lowering the activity of aluminum.

(3) High-purity aluminum can be obtained by adding aluminum scrap to the copper-aluminum alloy to adjust the copper content thereof to 30 to 35% and refining the alloy by the known three-layer molten salt electrolytic process. The copper is recycled for reuse.

EXAMPLE 4

Preparation of Metallic Molybdenum by Thermal Decomposition of Molybdenum Disulfide (1) A 50 g quantity of molybdenum disulfide reagent (99.5% in purity) was placed into the graphite crucible and irradiated with plasma arcs for 160 seconds under the same conditions as in Example 1 to melt and decompose the reagent and obtain 27.5 g of a block of metallic molybdenum. Accordingly, the molybdenum recovery was 92.2%.

During the period of from 30 seconds to 100 seconds after the start of irradiation, a white substance resembling silk threads was found to sputter and suspend around the arc flames. The substance was sulfur produced by thermal decomposition and free from the odor of sulfur dioxide. Thus, the reagent can be refined in an acceptable environment.

(2) The metallic molybdenum block obtained was 9.55% in carbon content and up to 0.001% in sulfur content. The fact that such a metallic molybdenum block of low sulfur content can be obtained has not been disclosed in literature (e.g., U.S. Pat. No. 4,234,334, Examined Japanese Patent Publication SHO 60-53088 and Mining Association of Japan, Spring Meeting, Abstracts of Lectures, p. 163, (1984).

The greatly reduced sulfur content is thought attributable to the complete decomposition of molybdenum disulfide by the treatment conducted by the strongly reducing plasma arc of the invention in the crucible, and to the following desulfurization reaction in the molten metal other than mere thermal decomposition.

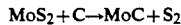

$$MoS_2 + C \rightarrow MoC + S_2$$

(3) The carbon in metallic molybdenum can be removed therefrom, for example, when ferromolybdenum is prepared from a block of metallic molybdenum, by adding mill scale or iron oxide to the block to obtain the iron alloy.

Although the molybdenum disulfide reagent was used in the present example, the same result as above will be obtained in the case of molybdenite containing silicic acid, iron oxide, alumina, copper, etc. since these compound evaporate off or convert into slag during smelting.

EXAMPLE 5

Smelting of Ilmenite (1) The ilmenite used in this example was in the form of smalls having the chemical composition (wt. %) given in Table 4.

TABLE 4

| $TiO_2$ | FeO | $Fe_2O_3$ | MgO | $SiO_2$ | $Al_2O_3$ |
|---|---|---|---|---|---|
| 55.32 | 22.15 | 16.50 | 0.86 | 0.51 | 0.40 |

(2) Finely divided graphite (60 g) was admixed as an auxiliary reducing agent with 200 g of the ilmenite, and the mixture was placed into a graphite crucible, 160 mm in inside diameter, and irradiated with plasma arcs in air for 120 seconds at a power level of 70 kW using the plasma arc generator of FIG. 1 to heat, melt and reduce the ore.

(3) Consequently, iron oxide was preferentially reduced to metallic iron, which collected at the bottom in the form of a mass of molten iron, with a titanium-enriched slag layer formed thereon. After solidification on cooling, the product was crushed to recover the mass of iron, and iron in the form of fine particles was removed from the high-titanium slag layer by magnetic separation.

(4) The high-titanium slag thus obtained was 65.17 wt % in titanium content and 108.7 wt. % in titanium oxide content calculated as titanium dioxide. This indicates that the titanium oxide was reduced to lower-grade oxides such as TiO and $Ti_2O_3$. The iron content was 0.96 wt. %. Accordingly, the titanium in the ore was concentrated from the original content of 33.16 wt. % to 65.17%, i.e., about twofold concentration.

(5) With addition of about 30 wt. % of graphite, the high-titanium slag was placed into the graphite crucible again and heated and reduced for 150 seconds under the same conditions as above to obtain metallic titanium Table 5 shows the composition (wt. %) of the metallic titanium obtained.

TABLE 5

| Ti | C | Fe |
|---|---|---|
| 95.56 | 2.63 | 0.06 |

(6) Table 5 reveals that the iron content greatly reduced to a very low level because the iron evaporated off during heating and reduction, indicating that the presence of a small amount of iron in the high-titanium slag, as left unremoved by the separation of iron, poses no problem.

The metallic titanium obtained inevitably has a high carbon content because the reduction is achieved with powerful carbon at a high temperature. However, the carbon is removable by refining the crude titanium by the molten salt electrolytic process wherein the titanium is used as an anode (Journal of Japan Metal. Soc., Vol. 35 (1971), pp. 282-288) or by using the titanium as a master alloy as alloyed with iron, copper, aluminum or the like.

INDUSTRIAL APPLICATION

The invention is usable as a direct smelting process with use of a thermal plasma.

We claim:

1. A direct smelting process wherein an ore or metal oxide is melted and reduced or thermally decomposed by a thermal plasma having a reducing atmosphere to obtain a metal or product enriched in metal, the direct smelting process comprising the steps of providing a multiplicity of graphite electrodes in an air environment and in spaced relationship to the ore or metal oxide; and applying a polyphase current voltage to the multiplicity of graphite electrodes in a manner causing a direct arc discharge between adjacent electrodes in the air environment, producing a strongly reducing nontransferred plasma arc from a resulting oxidation decomposition of the graphite electrodes, and jetting the plasma arc from the tops of the electrodes directly against the ore or metal oxide for smelting.

2. A direct smelting process as defined in claim 1, wherein the multiplicity of graphite electrodes are in a circular array in which the electrodes are inclined downwardly and inwardly toward a common point so that the tips of the electrodes are approximately equidistantly spaced apart on a substantially circular line.

3. A direct smelting process as defined in claim 1, wherein the polyphase current voltage is a three-phase a.c. voltage that is applied via an electrode group comprising three graphite electrodes.

4. A direct smelting process as defined in claim 1, wherein the material to be smelted is rotated during smelting.

5. A direct smelting process according to claim 1, wherein the jetting out of the plasma arc is performed concentrically by the action of electromotive forces.

6. A direct smelting process according to claim 5, wherein the electrodes are arranged in pairs, and said electromotive forces are produced by energizing the pairs with a.c. voltages that differ in phase from pair to pair.

* * * * *